United States Patent
Svendsen

(10) Patent No.: US 9,336,164 B2
(45) Date of Patent: May 10, 2016

(54) SCHEDULING MEMORY BANKS BASED ON MEMORY ACCESS PATTERNS

(71) Applicant: APPLIED MICRO CIRCUITS CORPORATION, Sunnyvale, CA (US)

(72) Inventor: Kjeld Svendsen, Sunnyvale, CA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 177 days.

(21) Appl. No.: 13/644,935

(22) Filed: Oct. 4, 2012

(65) Prior Publication Data

US 2014/0101381 A1 Apr. 10, 2014

(51) Int. Cl.
| | |
|---|---|
| *G06F 12/02* | (2006.01) |
| *G06F 13/16* | (2006.01) |
| *G06F 11/34* | (2006.01) |
| *G06F 11/30* | (2006.01) |

(52) U.S. Cl.
CPC ........ *G06F 13/1642* (2013.01); *G06F 11/3037* (2013.01); *G06F 11/3409* (2013.01); *G06F 12/0215* (2013.01); *G06F 11/3062* (2013.01)

(58) Field of Classification Search
USPC .......................................................... 710/45
See application file for complete search history.

(56) References Cited

U.S. PATENT DOCUMENTS

| | | | | |
|---|---|---|---|---|
| 5,060,188 | A * | 10/1991 | Zulian et al. ....................... 711/5 |
| 6,381,672 | B1 * | 4/2002 | Strongin et al. ............. 711/105 |
| 7,133,995 | B1 * | 11/2006 | Isaac et al. ................... 711/204 |
| 8,873,329 | B1 * | 10/2014 | Zheng et al. ............. 365/230.01 |
| 2004/0123067 | A1 * | 6/2004 | Sprangle et al. ............... 711/204 |
| 2005/0071536 | A1 * | 3/2005 | Osborne ........................... 711/5 |
| 2006/0095646 | A1 * | 5/2006 | Gower et al. ................. 711/100 |
| 2008/0065819 | A1 * | 3/2008 | Guo et al. ...................... 711/105 |
| 2008/0183977 | A1 * | 7/2008 | Gower et al. ................. 711/154 |
| 2009/0013108 | A1 | 1/2009 | Rajamani |
| 2009/0327596 | A1 | 12/2009 | Christenson et al. |
| 2010/0191997 | A1 * | 7/2010 | Dodeja et al. ................. 713/323 |
| 2012/0059983 | A1 * | 3/2012 | Nellans et al. ................ 711/105 |
| 2013/0080621 | A1 * | 3/2013 | Jain et al. ...................... 709/224 |
| 2014/0101380 | A1 * | 4/2014 | Svendsen ...................... 711/105 |

OTHER PUBLICATIONS

Stankovic et al. "DRAM Controller with a Complete Predictor: Preliminary Results." Sep. 2005. IEEE. TELSIKS 2005. pp. 593-596.*

Khursid et al. "Stride- and Global History-based DRAM Page Management." Jun. 2012. http://www.cs.utah.edu/~rajeev/jwac12/papers/paper_4.pdf.*

(Continued)

*Primary Examiner* — Nathan Sadler

(74) *Attorney, Agent, or Firm* — Amin, Turocy & Watson, LLP

(57) ABSTRACT

Systems and methods are provided that facilitate memory storage in a multi-bank memory device. The system contains a memory controller and a memory array communicatively coupled to the memory controller. The memory controller sends commands to the memory array and the memory array updates or retrieves data contained therein based upon the command. If the memory controller detects a pattern of memory requests, the memory controller can issue a preemptive activation request to the memory array. Accordingly, memory access overhead is reduced.

20 Claims, 10 Drawing Sheets

(56) References Cited

OTHER PUBLICATIONS

Kuroyanagi et al. "Service Value Aware Memory Scheduler by Estimating Request Weight and Using per-Thread Traffic Lights." Jun. 2012. http://www.cs.utah.edu/~rajeev/jwac12/papers/paper_7.pdf.*

DDRn Memory Interface IP, http://www.synopsys.com/IP/InterfaceIP/DDRn/Pages/default.aspx, Date: Oct. 4, 2012.

* cited by examiner

SCHEDULING MEMORY BANKS BASED ON MEMORY ACCESS PATTERNS

FIELD

This disclosure relates to memory management of a memory device, and more particularly cost efficient management of a multi-bank memory systems and methods.

BACKGROUND

In multi-bank memory systems, a memory controller connects to a memory device and a microprocessor. A microprocessor sends requests to the memory controller and a memory controller processes requests to access a bank storing data in a memory device. In this way, a memory controller acts as a liaison between a microprocessor and a memory device.

A memory controller may connect with multiple microprocessors and multiple memory devices. Likewise, a microprocessor may connect with multiple memory controllers. For example, a memory controller can connect to one or more dual in-line memory modules (DIMMs) via a set of buses and each DIMM can contain multiple dynamic random access memory (DRAM) devices. In some devices, a microprocessor couples to multiple memory controllers and each memory controller couples to multiple memory devices. A memory controller manages each memory device coupled to the memory controller.

Many memory devices, such as a DRAM device, contain one or more arrays of storage elements organized into ranks, banks, pages, rows and columns. Each rank of memory is a set of one or more DRAM devices that operate in lockstep in response to a command. A bank is a number of independent DRAM arrays within a DRAM device. Thus, each rank can comprise a number of banks and each bank can contain a number of pages. At the lowest level, pages are organized in rows and columns.

Every access to memory uses a certain amount of power and time (latency). To access a memory device, memory controllers process an address of memory to identify the rank, bank, row and column of an appropriate memory device. Once identified, a bank must be opened, or pre-charged, and a row or page must be activated before data is sent or received into memory. Upon receiving a request, a corresponding rank and bank must be determined. From there, the row and certain columns within the bank are selected to perform a read or write operation.

Additionally, memory controllers send data and commands to memory devices via bus lines. Bus lines are also used to carry information in response to commands back to a memory controller. Generally, the full width of a bus line is not constantly used during memory accesses.

In the past, read and write operations in typical memories took place only on the rising or falling edge of a clock signal. Today, many devices utilize double data rate (DDR) memories. DDR memories are read and written both on rising edges and on falling edges of a clock signal. This allows DDR memories to double the data rate.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

In an implementation, a processing unit, such as a central processing unit (CPU), microprocessor, non-transitory signal processor, or other device sends a request or a series of requests to a memory controller. Each request is typically in the form of a read or write request. Requests are stored in one or more request queues until they are processed. A scheduler coupled to the one or more request queues can schedule the order, timing and processing of requests to a memory storage device, such as a DDRX, wherein X is an integer denoting a generation (e.g., DDR, DDR2, DDR3, DDR4, etc.), optical storage devices, volatile memory devices, mechanical storage devices, magnetic disk drive, solid state disks (SSD) floppy disk drives, tape drive, Zip drives, LS-100 drives, flash memory cards, or memory sticks, for example. The memory storage device contains a number of addressable banks and each bank contains a number of pages. A memory access scheduler component monitors access to the banks and pages of memory, including non-data requests, such as activation requests. The monitored memory accesses can develop into a pattern. The memory access scheduler can recognize the pattern and issue requests to open a given bank and/or bank page before a request is sent by the processing unit or before it is received by the memory controller.

In one implementation, a memory access scheduler component determines a pattern of bank activations given a set of requests in a request queue. The memory access scheduler can schedule a request to pre-charge or open a bank at a time determined to reduce the overall time to complete a set of requests and increase bus usage. In one aspect, the memory access scheduler component cooperatively issues requests with the scheduler component. In another implementation, the memory access scheduler component is included within the scheduler component.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which.

DETAILED DESCRIPTION

Figure 1:
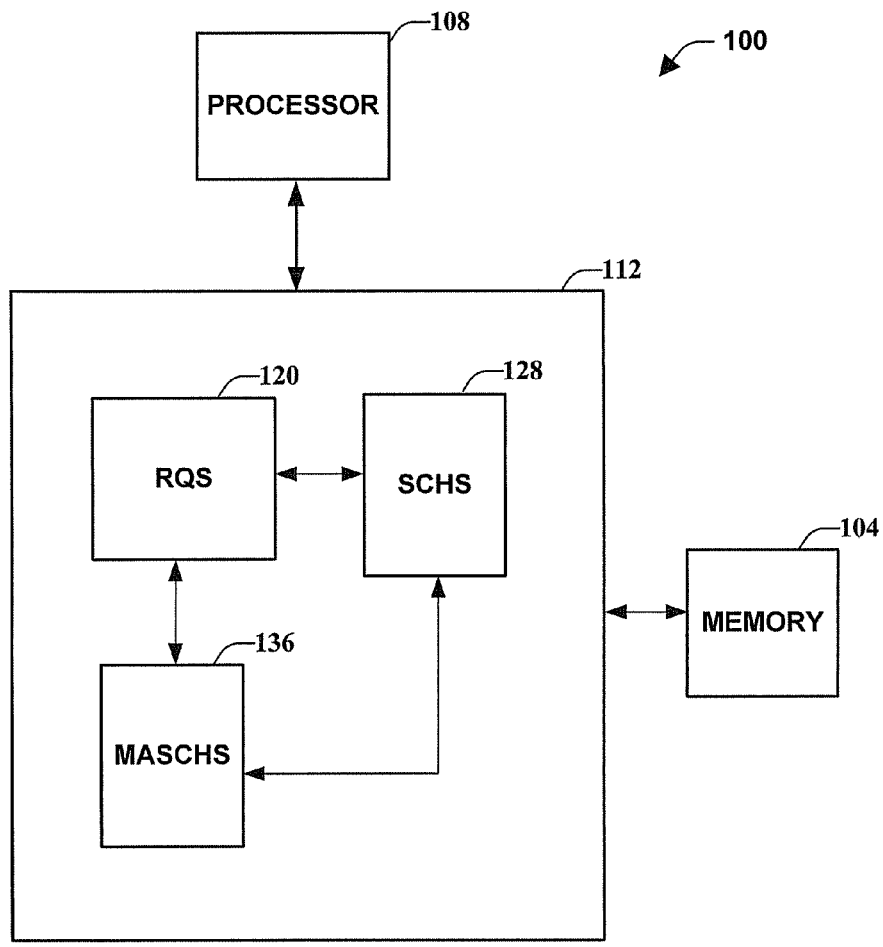
FIG. 1 illustrates a high-level functional block diagram of an example memory system in accordance with various aspects of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to storage and retrieval of data in a memory device. In one implementation, a memory system predicts memory access patterns and pre-opens banks of memory in anticipation of a future memory access request. It is appreciated that a memory system can be within larger devices such as smart phones, tablets, e-readers, digital video recorders, mobile music players, personal computers, servers, memory sticks, digital video recorders (DVRs), solid state machines, consumer electronics and the like.

Electronic memory systems disclosed herein can benefit from lower access times to memory devices and lower power consumption via memory access predictions. Memory access predictions can reduce overhead if pages are opened ahead of time according to an identified pattern. Further, power consumption can be reduced by opening bank pages in an efficient manner. It is appreciated that memory devices are capable of utilizing various timing, or clock signals. Accordingly, one of ordinary skill will appreciate various timing constraints associated with various applicable types of memory (SDRAM, LLDRAM, DRAM, etc.) are inherent to the various systems and methods described below and may not be included for readability and clarity.

According to one aspect of this disclosure, a processing unit issues read and/or write requests to a memory system. The memory system processes the requests and can return data to the processing unit. During processing, the memory system can process many requests and activate a closed bank in a memory device before processing requests associated with the closed bank within the memory device.

Accesses to a memory device may require a memory controller to open and close banks and bank pages. A memory access scheduler can observe the opening and closing of banks and bank pages to determine if a stride or other pattern of memory access exits. The memory access scheduler can apply detected patterns to predict if a closed bank or bank page will need to be opened and open the bank or bank page. The memory access scheduler can open the bank or bank page ahead of time to reduce or eliminate overhead associated with memory access.

In one implementation, a memory system is contained within a server device. The server device is connected with a number of other devices, such as client devices and other server devices. The sever device manages requests and communication with the other devices. The memory system within the server can monitor memory accesses and predict when a bank will need to be opened. The memory system can open the bank before immediate access is needed. Accordingly, access time to the memory system and power consumption can be decreased. Likewise, the server device can be improved and process commands with higher efficiency and greater bus utilization.

In this disclosure, various systems and methods are described. Generally, this disclosure will refer to predicting patterns of access to and opening banks. It is appreciated that the various systems and methods can be applied to bank pages, rows and columns. However, for brevity, this disclosure refers to banks in general.

Additionally, in this disclosure various systems and methods generally refer to a memory, memories, a memory device (s), a storage device(s), a memory storage device(s), or the like are generally intended to refer to a computer-related entity, either hardware (e.g., a circuit), a combination of hardware and software, and/or an entity storing data, electronically, optically, mechanically or otherwise. For example, a memory may be, but is not limited to being, an electronic memory device storing non-transitory signals via a combination of circuitry and control algorithms. Generally, the various systems and methods apply to memory devices utilizing a bank system and/or systems and methods having an overhead pertaining to a bank system.

Referring now to FIG. 1, there is illustrated a non-limiting exemplary implementation of a data storage and access system 100 that provides data storage and access in accordance with various aspects of this disclosure. The system 100 provides for storage and access of data in memory 104. Memory 104 can include one or more suitable types of memory modules including DDRX, various types of DRAM, SDRAM, holographic memories, magnetic memories, and mechanical memories for example. Processor 108 can send requests to memory controller (MC) 112, and MC 112 can receive requests. Additionally, MC 112 can send data to processor 108, and processor 108 can receive data from MC 112.

In FIG. 1, system 100 includes a computer processing unit 108 capable of executing various components stored in a computer readable storage medium and issuing requests to MC 112. MC 112 can include one or more request queues (RQs) 120, one or more schedulers (SCHs) 128, one or more memory access schedulers (MASCHs) 136, memory 104 and processor 108. MC 112 is coupled to memory device 104 and processor 108. The various components may be contained on one integrated circuit, or on a number of individual circuits coupled together.

MC 112 receives a request or series of requests from processor 108 and converts the request(s) into a series of commands suitable for memory 104. RQs 120 can store requests or converted commands. For sake of brevity, this disclosure will refer to RQs storing requests. RQs 120 may be arranged in various configurations, including but not limited to generic queue pools, arranged one queue per bank, or arranged one queue per rank.

SCHs 128 schedules access to memory 104 through electrical signaling interfaces. SCHs 128 may use a number of scheduling policies such as pipelining, row-buffer-management, open-page row-buffer-management, close-page row-buffer-management, or hybrid row-buffer management, for example. Once a command is scheduled, memory controller 112 can process the command and access memory 104.

In one implementation, memory 104 contains one or more ranks of memory. Each rank of memory contains a number of banks, and each bank comprises a number of pages. In most systems, only one page may be open per bank at any time. Likewise, many systems constrain the number of concurrently open banks per rank, or per system as a whole (e.g. systems employing a four active window (tFAW)). Thus, SCHs 128 must schedule open commands to different bank pages of memory 104 according to request in RQs 120.

MASCHs 136 observe access patterns to banks in memory 104. MASCHs 136 can determine a stride or other structural pattern of memory access based at least in part on one of scheduled commands, commands stored in RQS 120, or received commands from processor 108. In one implementation, MASCHs 136 determines a pattern by employing one or more pattern recognition techniques such as hash table, logic tree, or Rete algorithm.

MASCHs 136 can apply an identified pattern to schedule activation of a closed bank or bank page that is likely to be accessed in accordance with the identified pattern. In one aspect, MASCHs 136 schedules an activation command for a bank and MC 112 opens a bank before access to the bank is needed. In doing so, memory system 100 can reduce overhead incurred during a later access.

In one implementation, MASCHs 136 determine an appropriate time and order to open a bank page. For example, MASCHs 136 can avoid opening a bank page that will conflict with another command. Likewise, MASCHs 136 can include various page conflict avoidance components. In another aspect, memory access scheduler may issue an open command during a time which will reduce bandwidth on a bus line and/or increase speed of access.

In another implementation, MASCHs 136 can schedule or issue a bank open command for closed banks and avoid issuing bank opened commands for banks already open. In one aspect, MASCHs 136 can store a table of opened banks or of closed banks. In another aspect, MASCHs 136 can issue a command to determine if a bank page is open. Accordingly, memory system 100 can reduce needless open commands.

Figure 2:
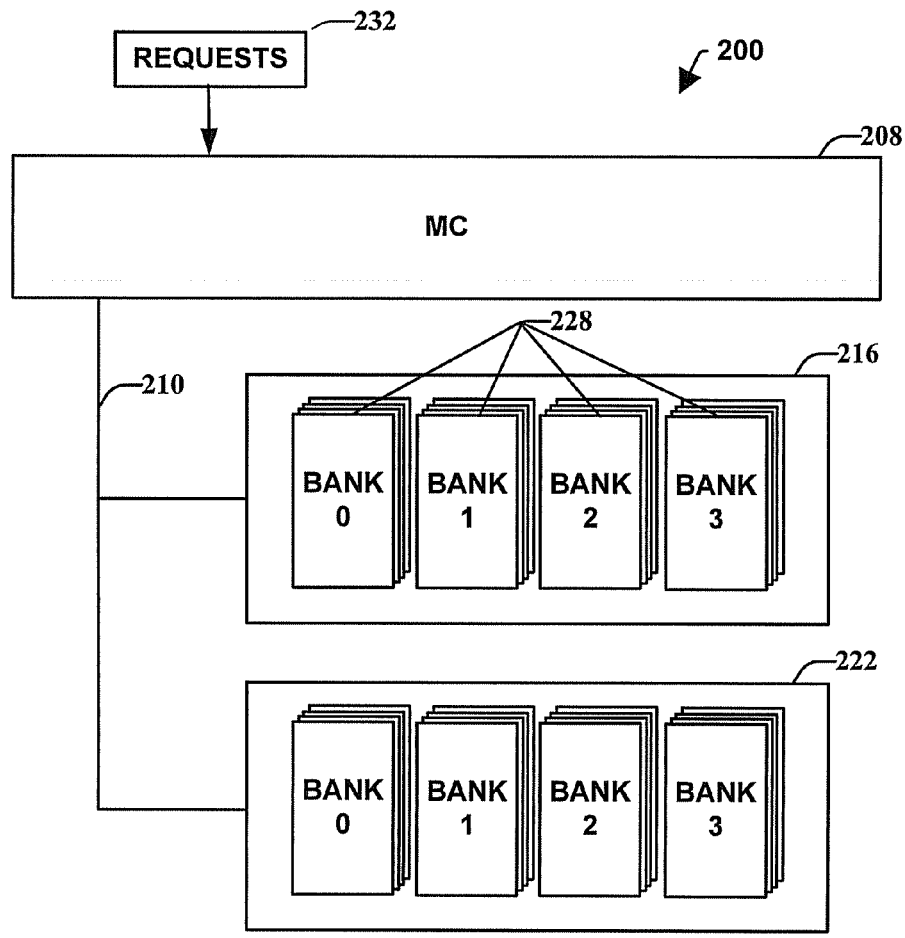
FIG. 2 illustrates a high-level functional block diagram of an example dual DIMM memory system including multiple memory banks in accordance with various aspects of this disclosure.

Turning to FIG. 2, there is illustrated a non-limiting exemplary implementation of a memory system 200 that provides data storage and data access within a memory device in accordance with various aspects of this disclosure. In FIG. 2, memory controller (MC) 208 is coupled to memory rank 216 and memory rank 222 by one or more bus lines 210. Each rank consists of a number of banks. For example, rank 216 consists of four banks 228 (Bank 0, Bank 1, Bank 2, and Bank 3). Each bank 228 comprises a number of pages.

While FIG. 2 illustrates two ranks each with for banks and each bank with four pages, memory system 200 can comprise more or less banks or ranks. For example, memory system 200 could comprise n ranks, each rank comprising m banks, and each bank comprising p pages, where n, m, and p are real integers. Typically, n, m, and p are each a power of two and need not be equal (e.g., two, four, eight, sixteen or 32). In one implementation, memory devices are interchangeable and memory system 200 can contain memory devices of various sizes at any given time. For purposes of brevity, this disclosure will refer to a system with two ranks, each rank with four banks and each bank with four pages.

MC 208 receives requests 232 and translates requests into commands. MC 208 can translate the requests into commands suitable for rank 216 and rank 218. MC 208 determines which rank must be accessed, which bank of the appropriate rank must be accessed, and which page of the bank must be accessed. Thus, MC 208 can schedule a request to the appropriate addressable memory location of rank 216 or rank 222.

MC 208 also monitors the memory access, requests, and commands. MC 208 can determine any stride or pattern within the memory access, requests and/or commands. MC 208 can store a number of recognized patterns, such as in a table, library, hash tree, and the like. The recognized patterns are applied to requests to be processed. If MC 208 recognizes a pattern among requests not yet processed, then MC 208 can schedule a non-data command, such as an activation command. For example, MC 208 can recognize a pattern from incoming requests 232. MC 208 can determine what rank and bank will likely need to be activated, such as rank 216 bank0 228. Rank 216 bank0 228 can be activated ahead of time as determined by MC 208. Accordingly, MC 208 can more fully utilize one or more bus lines 210. In one aspect, a bank 228 is activated even before a request is received by MC 208.

Figure 3:
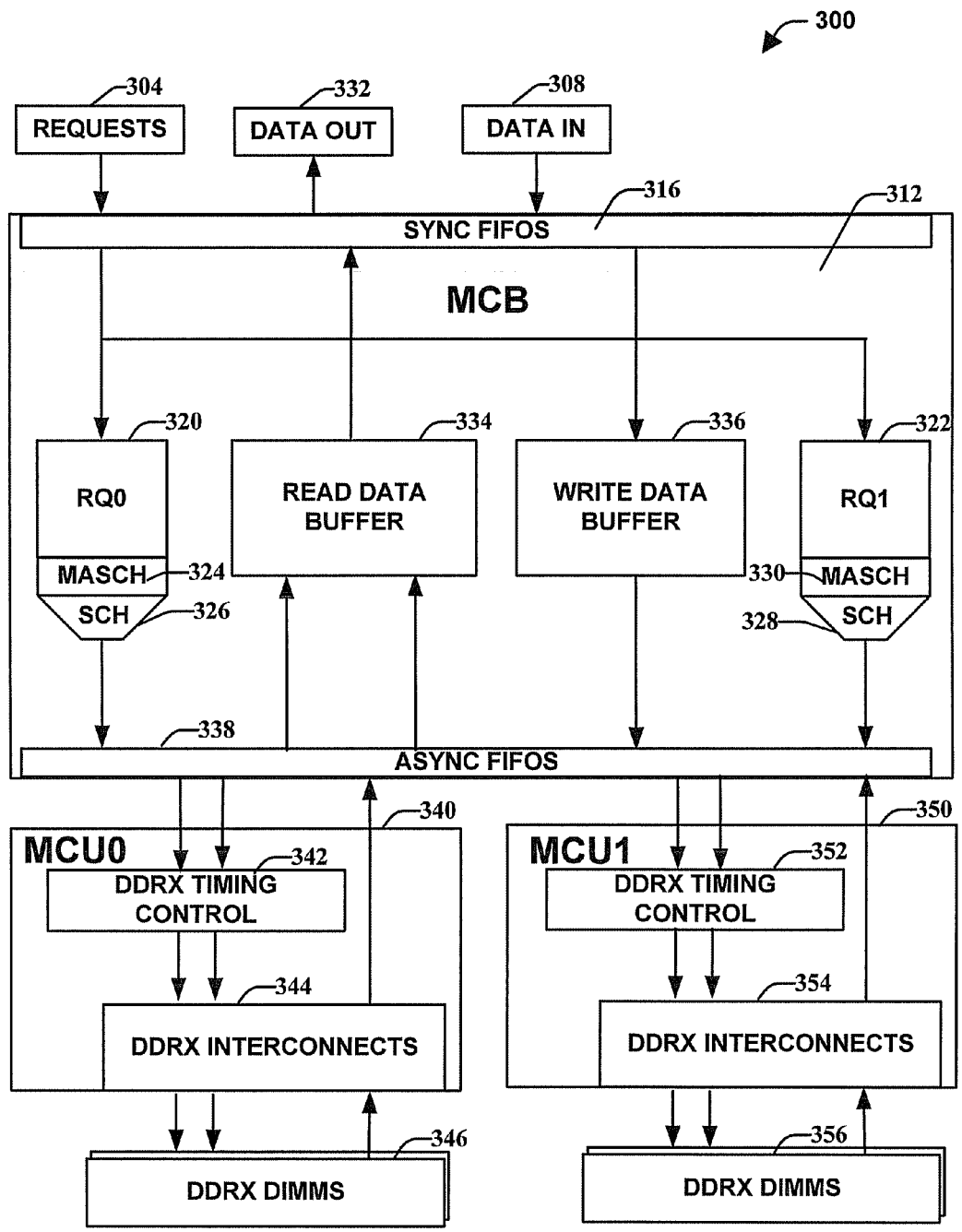
FIG. 3 illustrates an exemplary schematic diagram of a memory system in accordance with various aspects of this disclosure.

Referring to FIG. 3, there is illustrated a non-limiting exemplary implementation of memory system 300 that provides data access and storage according to various aspects of this disclosure. In use, a processor or other device issues requests 304 and, in some cases, sends data 308 to be stored in memory system 300. Memory system 300 includes a memory control block (MCB) 312 comprising various components, including, sync first-in-first-out queues (FIFOs) 316, RQ0 320, RQ1 322, SCH 326, SCH 328, MASCH 324, MASCH 330, read data buffer 334, write data buffer 336 and Async FIFOs 338. In one embodiment, memory system 300 also includes one or more MCUs, such as MCU0 340 and MCU1 350. MCU0 340 can include DDRX timing control 342, and DDRx interconnects 344, where "DDRX" stands for generation X (1, 2 or 3, etc.) of the various DDR standards. MCU1 350 can include DDRX timing control 352, and DDRX interconnects 354 (e.g. DDRX PHYs). MCU0 340 is coupled with one or more DDRX DIMMs 346 and MCU1 350 is coupled with one or more DDRX DIMMs 356.

In one embodiment, MCB 312 receives requests 304 and data 308 via sync FIFOs 316. Sync FIFOs 316 are coupled to RQ0 320, RQ1 322, read data buffer 334, and write data buffer 336. Sync FIFOs 316 send data or requests to an appropriate component. For example, if request 304 is a write request, data 308 is sent to write data buffer 332 and commands are issued to RQ0 320 or RQ1 322. In one implementation, RQ0 320 and RQ1 322 may each contain up to j commands, where j is a real integer. In other example, j is a power of two (e.g., 2, 4, 8, 16, etc.).

MASCH 324 can monitor requests in RQ0 320 and SCH 326. Likewise, MASCH 330 can monitor requests in RQ1 322 and SCH 328. The monitored requests and scheduled requests can form a pattern. MASCH 324 and MASCH 330 can determine the existence of one or more patterns and predict if and when a bank in DDRX DIMMs 346 or in DDRX DIMMs 356 will need to be opened in the future.

In one example, MASCH 324 and MASCH 330 can add activation commands to respective RQs. In another example, MASCH 324 and MASCH 330 schedules activation commands ahead of time in conjunction with the respective SCHs.

Figure 4:
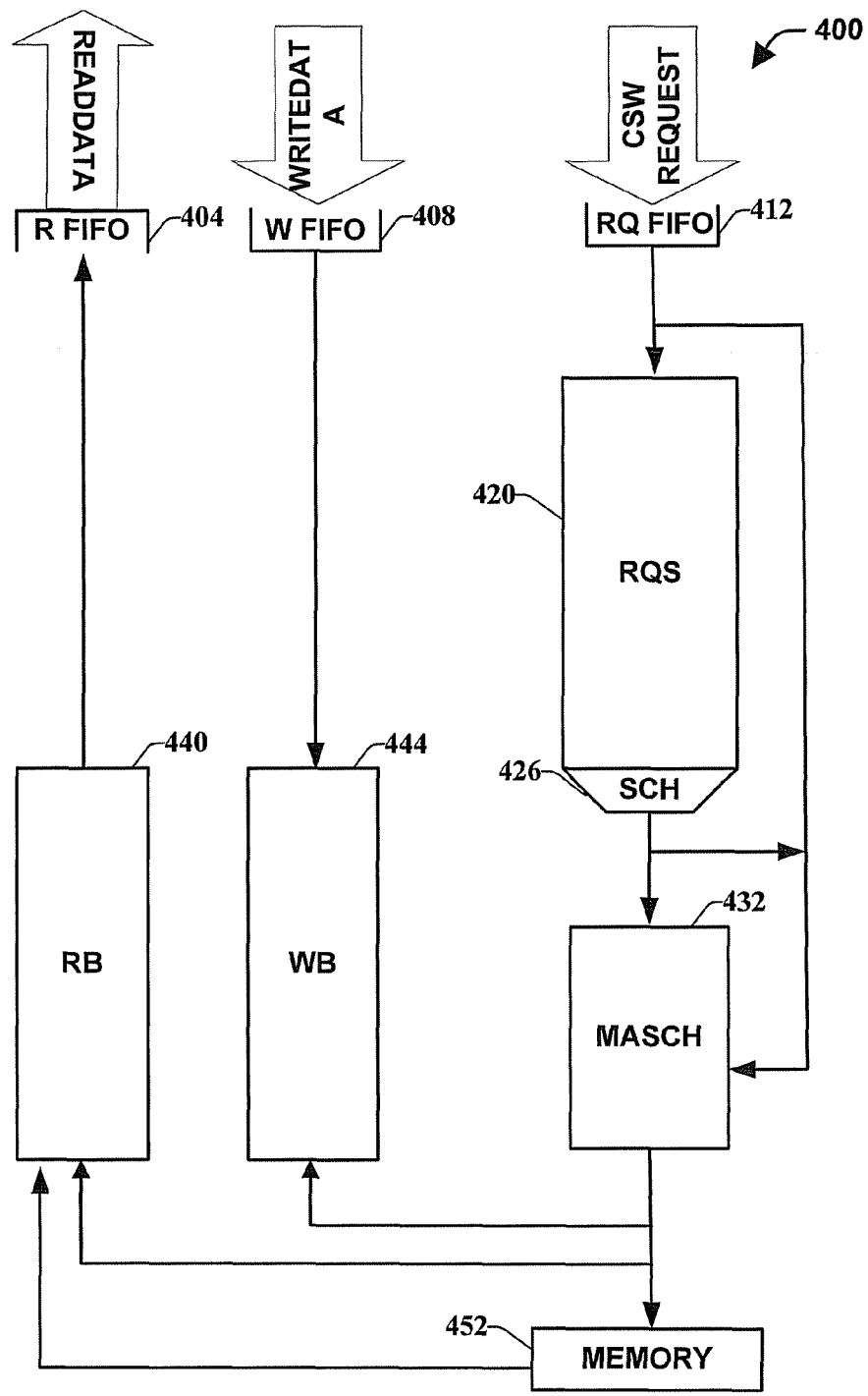
FIG. 4 illustrates an schematic diagram of an example memory system including a separate memory access scheduler in accordance with various aspects of this disclosure.

Turning now to FIG. 4, there is illustrated a non-limiting exemplary implementation of a memory system 400 that provides data storage and retrieval, according to an aspect of this disclosure. Memory system 400 includes various components in communication with each other, such as on one or more coupled integrated circuits. Memory system 400's components include read FIFO (R FIFO) 404, write FIFO (W FIFO) 408, request FIFO (RQ FIFO) 412, RQs 420, SCH 426, MASCH 432, read data buffer (RB) 440, write data buffer (WB) 444, and memory 452. It is to be appreciated that memory system 400 can contain various other components not shown here for brevity.

In one embodiment, data retrieved from memory 452 as a response to a read request is sent to RB 440, RB 440 sends read data to R FIFO 404 and R FIFO 404 sends read data to a component, such as a computer processor. In another aspect, W FIFO 408 receives write data in conjunction with a write request received by RQ FIFO 412. WB 444 receives and temporarily stores write data from W FIFO 408.

RQ FIFO 412 sends requests to RQs 420. RQs 420 store requests to be scheduled to retrieve, store or otherwise access memory 452. SCH 426 schedules memory commands to be issued to memory 452.

MASCH 432 can monitor requests issued to RQs 420 and SCH 426's scheduled requests. MASCH 432 determines if a pattern or memory accesses is present. MASCH 432 can retain a number of detected patterns. Further, MASCH 432 can match stored patterns to scheduled requests or received requests to determine when a bank in memory 452 will need to be opened.

In one embodiment, MASCH 432 can issue a command to open a bank of memory 452. MASCH 432 can issue the command before it is needed to reduce overhead and increase bus utilization. Thus, MASCH 432 can supplement a likely future open command to a closed bank in memory 452 by preemptively opening the closed bank in memory 452.

In another embodiment, MASCH 432 is in communication with RB 440 and WB 444 to coordinate memory read and writes to memory 452. In an exemplary embodiment, MASCH 432 may have several bus connections with memory 452, such as a read data bus, write data bus and non-data command bus. In one aspect, the non-data command bus can carry commands to open particular banks in memory 452.

In another embodiment, MASCH 432 may contain a non-data command buffer. The non-data command buffer contains non-data commands such as activations, switches and the like. In one aspect, MASCH 432 can synchronize non-data commands to increase efficiency and decrease overhead related to memory 452 access.

In another non-exclusive exemplary embodiment, MASCH 432 contains a pattern buffer. The pattern buffer can store a set of recognized memory access patterns. In one aspect, MASCH 432 can store new recognized memory access patterns. In another aspect, MASCH 432 can compare a set of requests to previously stored memory access patterns to determine a probable bank to open.

Referring now to FIGS. 5-8, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium, integrated circuits containing various electrical components, and electronic devices.

Figure 5:
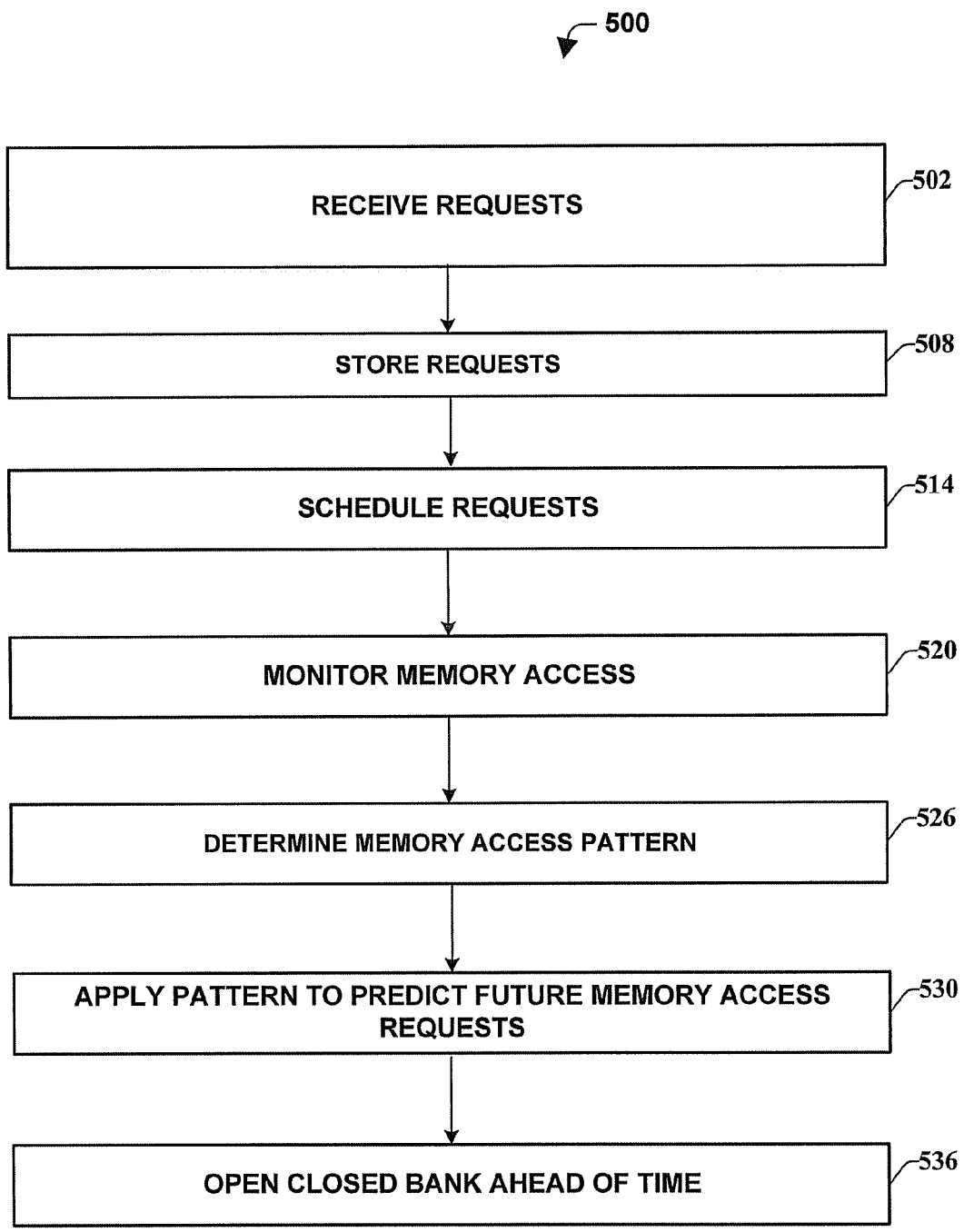
FIG. 5 illustrates an example methodology for monitoring and predicting memory access requests in accordance with various aspects of this disclosure.

With reference to FIG. 5, there is illustrated a methodology 500 for storing and accessing data in a memory device, according to an aspect of this disclosure. As an example, various electronic devices, such as, but not limited to, memory storage systems, server systems, person computers, cellular phones, consumer electronic and other electronic systems can utilize methodology 500. Specifically, methodology 500 access memory device(s) and converts received requests into data storage or data retrieval.

A memory system can receive one or more requests (e.g., by a computer processor) at 502. For example, a plurality of client devices (e.g., one or more smart phones, personal computers, tablet computers, and/or PDAs) can send requests to a server(s) through a communication framework (e.g., internet, cellular network, satellite and/or ethernet) and the server(s) can send requests to a memory system (such as memory system 100, for example). In another aspect, the set of requests can be stored in a computer readable memory system and sent to a computer readable memory subsystem (e.g., volatile and/or nonvolatile memory).

At 508, a memory system can store receive requests (e.g., via RQs 120). For example, the received requests can be transformed into a set of commands capable of instructing a memory (such as DDRX) and stored in a RQ.

Turning to 514, requests are scheduled for execution (e.g., via SCHs 128). In one aspect, requests are scheduled according to a scheduling scheme. Scheduling may be based on conflict avoidance, speed maximization, power minimization, reducing overhead, and/or maximizing performance.

At 520, requests are monitored (e.g., by MASCHs 136). Monitoring requests may include retaining a number of successive requests. In another aspect, monitoring requests may include storing sets of requests in a buffer, memory store, table, logic tree, virtual buffer, or other device.

At 526, a pattern of memory accesses can be determined via the requests (e.g., by a MASCH). For example, a MASCH can recognize a stride or other structural pattern of memory accesses. A pattern, for example, can be a series of commands including an open command to a bank of memory (for example, a bank in a DDR3 memory device).

Turning to 530, a pattern is applied to predict when an otherwise closed memory bank will likely need to be opened (e.g., by a MASCH). In another aspect, transitions between open and closed memory banks are predicted to increase overall performance of a memory system.

At 536, an otherwise closed memory bank predicted to be opened in the future is opened (e.g., by a MASCH or SCH). In one aspect, a memory bank open command is issued according to a conflict avoidance scheme. In another aspect, a memory bank is opened at a time that increase bus usage and reduces overhead.

Figure 6:
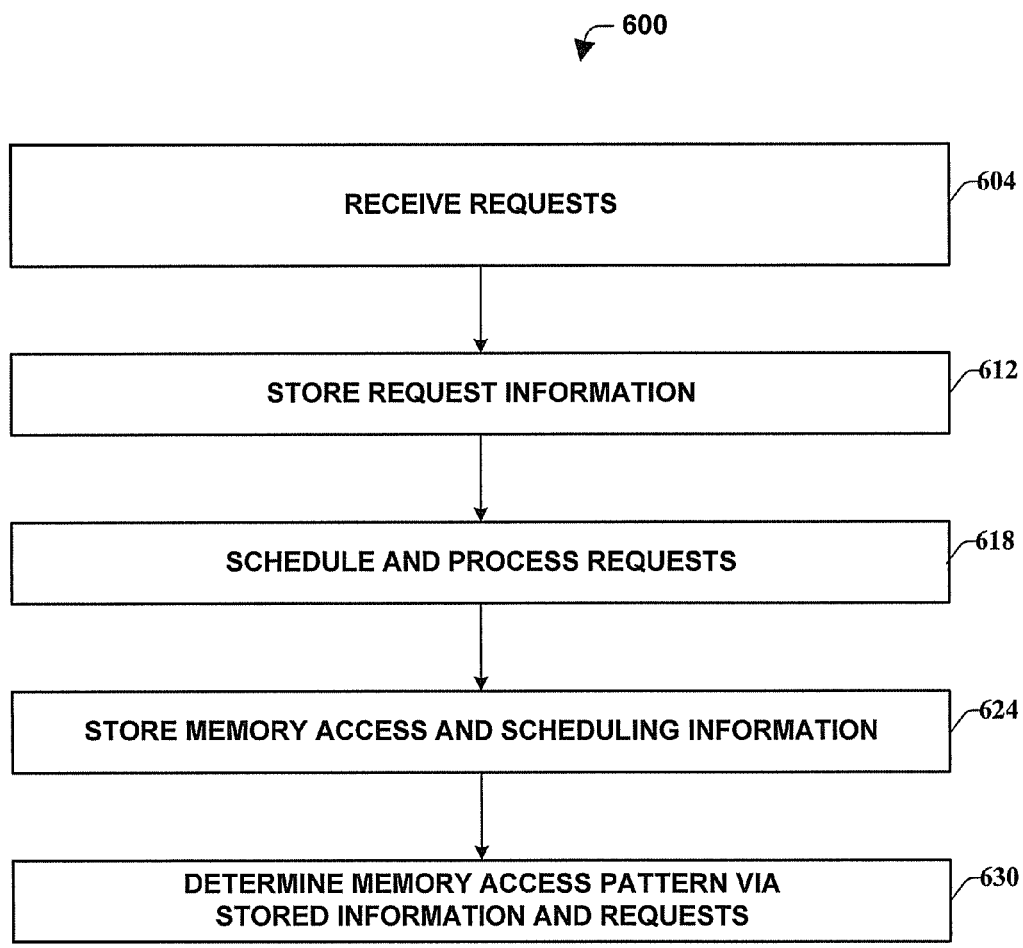
FIG. 6 illustrates an example methodology for monitoring memory access requests including issuing new memory access requests in accordance with various aspects of this disclosure.

With reference to FIG. 6, there is illustrated a methodology 600 for storing and accessing data in a memory device, according to an aspect of this disclosure. As an example, various electronic devices, such as, but not limited to, memory storage systems, server systems, personal computers, cellular phones, consumer electronic and other electronic systems can utilize methodology 600. Specifically, methodology 600 access memory device(s) and converts received requests into data storage or data retrieval.

A memory system receives memory access requests (e.g., FIFOs storing requests from a computer processor) at 604.

For example, one or more computer processors can issue read and/or write commands to a memory system (e.g., memory system 300).

At 612, a memory system can store information related to received requests (e.g., by a MASCH). For example, a memory system can store set of received requests in a buffer or memory device. In one aspect, an order of requests is maintained.

Turning to 618, requests are scheduled for execution (e.g., by a scheduler). In one aspect, requests are scheduled according to a scheduling scheme. Scheduling may be based on conflict avoidance, speed maximization, power minimization, reducing overhead, and/or maximizing performance. In another aspect, scheduled requests can be processed and a memory device can be accessed.

At 624, scheduled requests and memory access information is stored (e.g., by a MASCH component). In another aspect, storing requests and memory access information may include temporary or permanent storage of sets of requests in a buffer, table, or other memory device.

At 630, a pattern of memory accesses can be determined via stored requests, stored scheduled requests, and other memory access information (e.g., by a MASCH). For example, a MASCH can recognize a stride or other pattern of memory accesses by analyzing received requests and scheduled requests. A pattern, for example, can be a series of commands including an open command to a bank of memory which is repeated at least once (for example, a bank in a DDR3 memory device).

Figure 7:
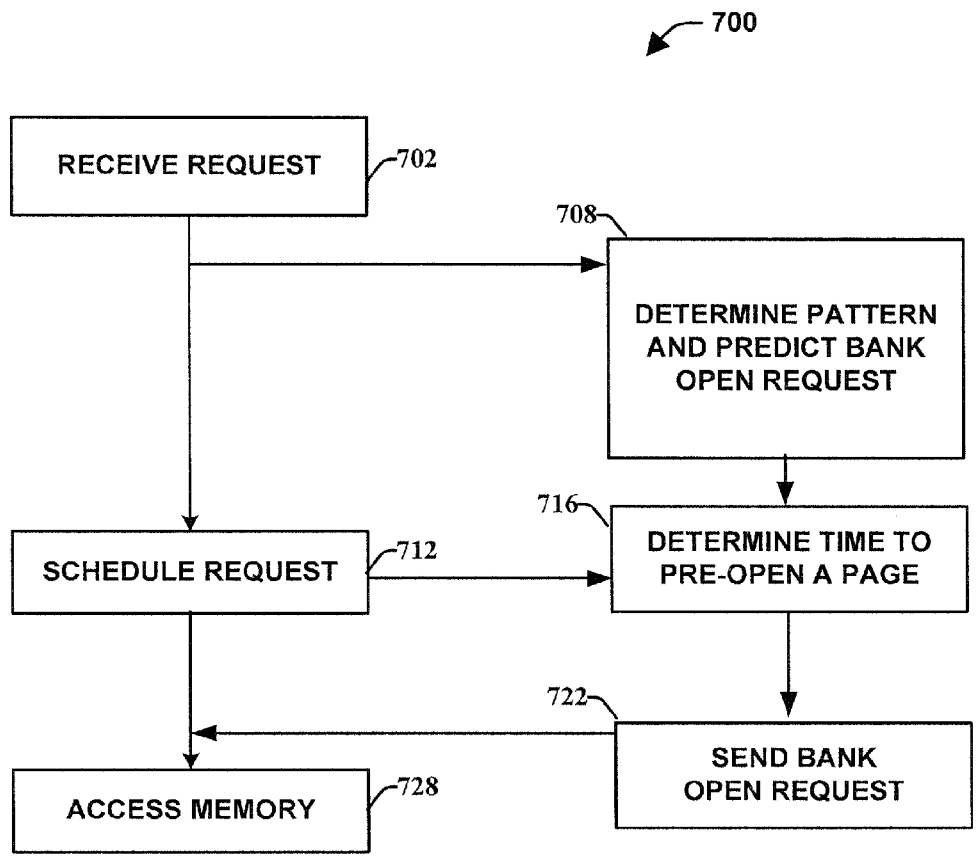
FIG. 7 illustrates an example methodology for monitoring memory access requests including preemptively issuing bank activation requests at an appropriate time in accordance with various aspects of this disclosure.

With reference to FIG. 7, there is illustrated a methodology 700 for storing and accessing data in a memory device, according to an aspect of this disclosure. As an example, various electronic devices, such as, but not limited to, memory storage systems, server systems, personal computers, cellular phones, consumer electronic and other electronic systems can utilize methodology 700. Specifically, methodology 700 access memory device(s) and converts received requests into data storage or data retrieval.

A memory system can receive one or more requests (e.g., by a computer processor and stored in one or more RQs) at 702. For example, a plurality of client devices can send requests to a server(s) through a communication framework (e.g., internet, cellular network, satellite and/or ethernet) and the server(s) can send requests to a memory system (such as memory system 100, for example). In another aspect, the set of requests can be stored in a computer readable memory system and sent to a computer readable memory subsystem (e.g., volatile and/or nonvolatile memory).

At 708, a pattern of memory access is determined based on received requests (e.g., by a MASCH component). For example, a MASCH can recognize a stride or other structural pattern of memory accesses. In another aspect, a pattern is applied to predict when an otherwise closed memory bank will likely need to be opened (e.g., by a MASCH).

Turning to 712, requests are scheduled for execution (e.g., by a scheduler). In one aspect, requests are scheduled according to a scheduling scheme. Scheduling may be based on various scheduling schemes, including but not limited to conflict avoidance, speed maximization, power minimization, reducing overhead, and/or maximizing performance.

At 716, a memory system determines when to pre-open a page (e.g., by a MASCH). In one embodiment, a memory system utilizes a bank predicted to be opened and scheduled requests to determine when to schedule an activation request. A memory system can also avoid bank conflicts, and reduce overhead (increase bus utilization and/or decrease time, for example).

At 722, an otherwise closed memory bank predicted to need opening is opened (e.g., by a MASCH). In one aspect, an activation command is sent to a memory device and a bank is pre-charged.

Turning to 728, a memory devices is accessed (e.g., by a MASCH and/or SCH). For example, scheduled requests are processed and a memory device is accessed. In one aspect, memory banks are opened according to a predetermined pattern. Thus, pages are opened ahead of schedule and overhead can be reduced while performance can be increased. A later request can then access the previously opened bank without issuing an open command.

Figure 8:
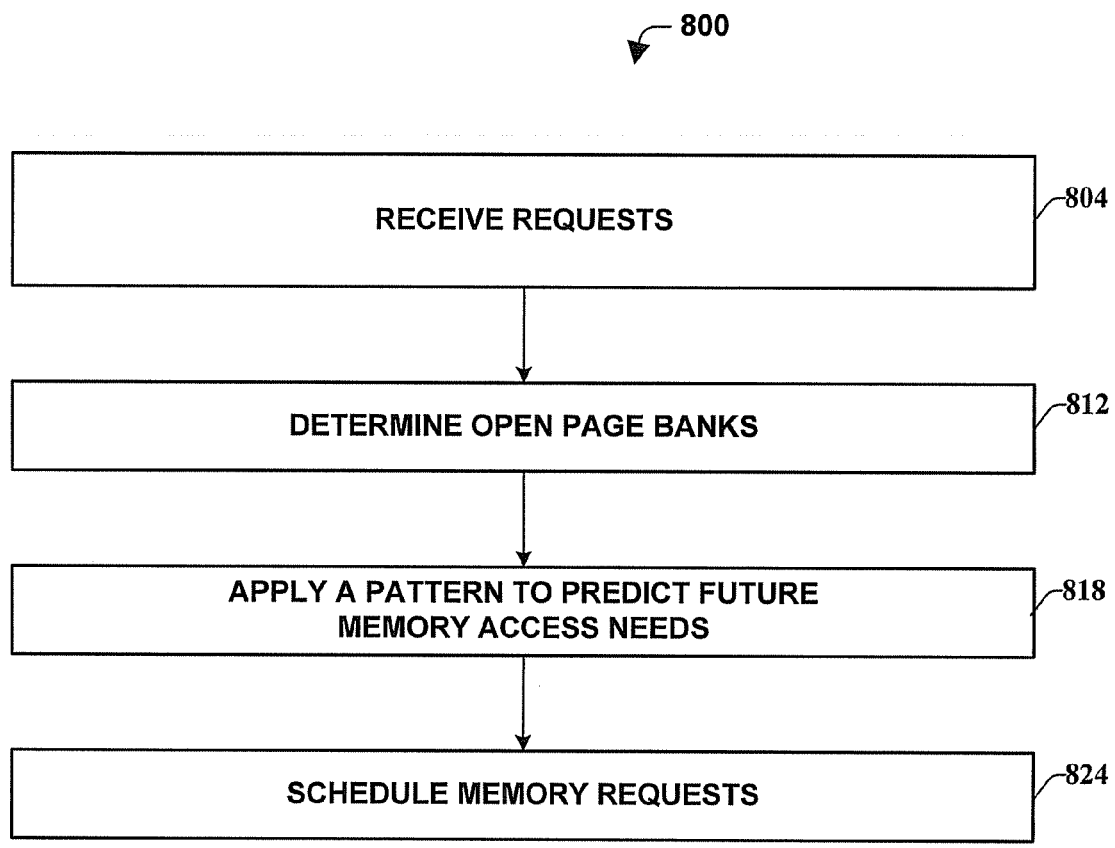
FIG. 8 illustrates an example methodology for monitoring memory access requests including preemptively issuing bank activation requests to closed banks accordance with various aspects of this disclosure.

With reference to FIG. 8, there is illustrated a methodology 800 for storing and accessing data in a memory device, according to an aspect of this disclosure. As an example, various electronic devices, such as, but not limited to, memory storage systems, server systems, personal computers, cellular phones, consumer electronic and other electronic systems can utilize methodology 800. Specifically, methodology 800 access memory device(s) and converts received requests into data storage or data retrieval.

A memory system can receive one or more requests (e.g., by a computer processor and stored in one or more RQs) at 804. For example, a processor in an electronic device can issue requests to a memory system located within or external to the electronic device.

Turning to 812, a memory system can determine which bank pages are open in a set of memory devices. For example, a MCU can check the status of bank pages, or a table can be kept of open and/or closed banks.

At 818, a previously determined pattern of memory access is determined to correspond with received requests and predict future memory access needs (e.g., by a MASCH component). For example, a MASCH can recognize a stride or other structural pattern of memory accesses. In another aspect, a pattern is applied to predict when an otherwise closed memory bank will likely need to be opened (e.g., by a MASCH).

Turning to 824, requests are scheduled for execution and an activation command to a bank predicted to need future access is only scheduled if the bank is not opened (e.g., as determined by a MASCH, status checks, or table look up). In one aspect, scheduling activations to only not opened bank pages can avoid conflicts, speed access, minimize power consumption, reduce overhead, and/or maximizing performance.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
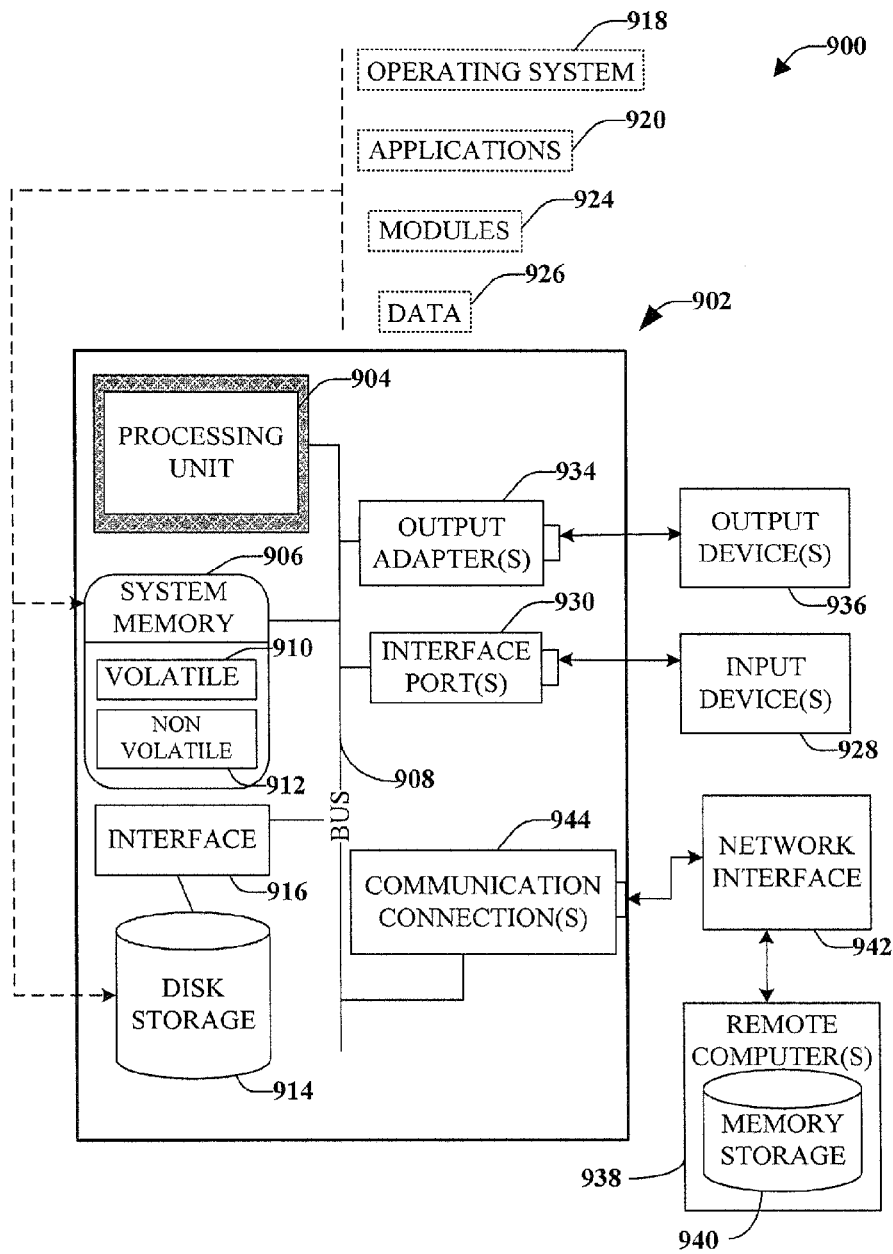
FIG. 9 illustrates an example schematic block diagram of a computing environment in accordance various aspects of this disclosure.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information. The client(s) 902 can include one more memory systems in accordance with aspects of this disclosure. For example, a client 902 can perform tasks and open memory banks ahead of time according to a recognized pattern.

The system 900 also includes one or more server(s) 904. The server(s) 904 can also be hardware or hardware in combination with software (e.g., threads, processes, computing devices). The server(s) 904 can house threads to perform transformations, for example. The server(s) 904 can also include various memory systems capable of identifying patterns and opening memory banks in accordance with this disclosure. One possible communication between a client 902 and a server 904 can be in the form of a data packet adapted to be transmitted between two or more computer processes wherein data may be accessed or stored in accordance with aspects of this disclosure. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one implementation, a client 902 can transfer data or requests to a server 904. Server 904 can store the data, perform requests, or transmit the data or request to another client 902 or server 904. At various stages, system 900 can implement memory systems in accordance with this disclosure. For example, the client(s) 902 and the server(s) 904 can each implement one or more memory systems in accordance with this disclosure.

Figure 10:
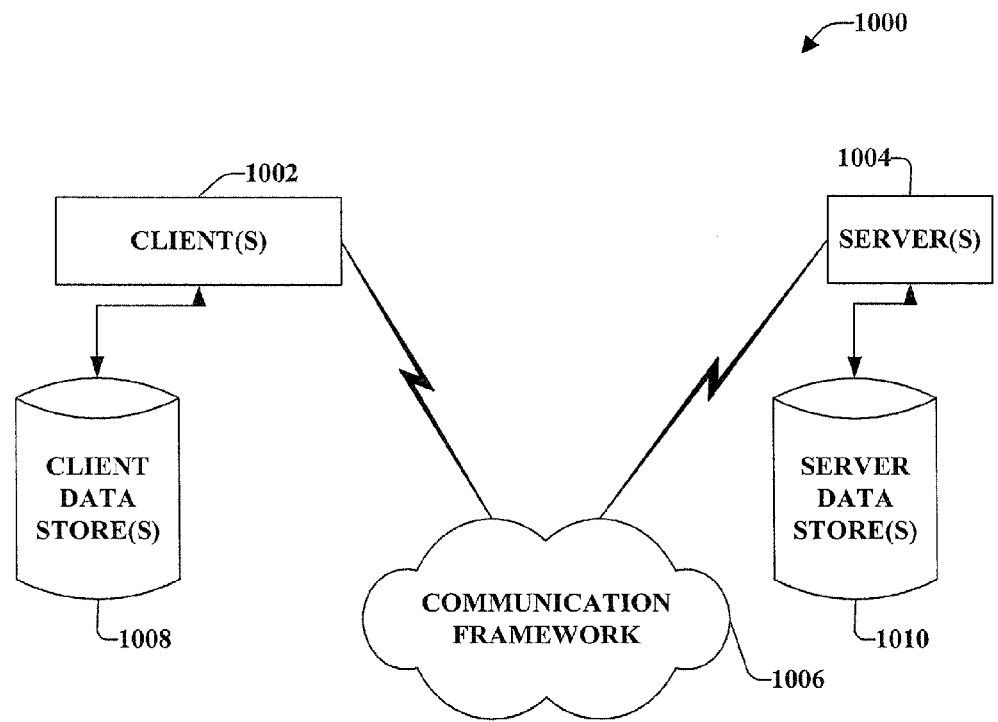
FIG. 10 illustrates an example block diagram of a computer operable to execute various aspects of this disclosure.

With reference to FIG. 10, a suitable environment 1000 for implementing various aspects of the claimed subject matter includes a computer 1002. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 can include volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRX SDRAM), and enhanced SDRAM (ES-DRAM). Volatile memory 1010 can implement various aspects of this disclosure, including memory systems containing MASCH components.

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software, software in execution, hardware, and/or software in combination with hardware that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems. For example, applications 1020 and program data 1026 can include software implementing aspects of this disclosure.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value, optical devices, and/or mechanical devices in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible, including various systems and methods employing memory bank systems and/or methods. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., data storage and retrieval); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A memory system, comprising:
   a computer-readable storage device comprising a plurality of banks;
   a request queue (RQ) component configured to process memory read and write requests;
   a pattern library configured to store multiple memory access patterns; and
   a memory access scheduler (MASCH) component configured to:
      determine a pattern of memory access to the plurality of banks based on a monitoring of the read and write requests and non-data commands associated with the read and write requests;
      select a stored pattern, of the multiple memory access patterns, that corresponds to the pattern;
      select, based on the stored pattern, a bank of the plurality of banks;
      determine a state of the bank of the plurality of banks based on a referencing of a stored table that identifies which of the plurality of banks are open; and
      in response to determining, based on the stored pattern, that the bank is to be opened at a future time, and determining, based on the state, that the bank is not currently open, schedule a command to open the bank at a time prior to the future time.

2. The memory system of claim 1, wherein the MASCH component is further configured to, based on determining that the state of the bank is in an open state, schedule the command as a bank activation command for the bank.

3. The memory system of claim 2, wherein the MASCH component is further configured to schedule the bank activation command before a request associated with the bank is processed by the RQ component.

4. The memory system of claim 2, wherein the MASCH component is further configured to:
   determine a time to schedule the bank activation command as a function of a performance.

5. The memory system of claim 4, wherein the performance comprises at least one of a bandwidth or a latency.

6. The memory system of claim 1, wherein the MASCH component is further configured to activate the bank according to the pattern of memory access.

7. The memory system of claim 1, wherein the pattern library is configured to store the memory access patterns in at least one of a hash table or logic tree.

8. The memory system of claim 7, wherein the MASCH component is further configured to compare the memory read and write requests and the non-data commands to the memory access patterns of the pattern library.

9. The memory system of claim 1, further comprising a computer processor configured to send requests to the RQ component.

10. The system of claim 1, wherein the computer-readable storage device comprises a double data rate X (DDRX) device, wherein X represents a generation of a DDR device.

11. A method of accessing memory, comprising:
    employing a processor, coupled to a memory device and configured for executing instructions stored in a tangible medium, to perform the following acts:
       storing multiple memory access patterns in a pattern library;
       receiving a plurality of requests, the requests comprising at least one of a read request or a write request;
       monitoring the plurality of requests;
       determining the existence of a pattern of requests and non-data commands based on the plurality of requests and the non-data commands;
       selecting a stored pattern, of the multiple memory access patterns, corresponding to the pattern;
       referencing a stored table that identifies which of a plurality of banks of the memory device are currently open; and
       scheduling, based on determining that a state of a bank of the memory device will be altered at a future time and that the table identifies the bank as currently not being open, a future command to open the bank of the memory device at a time prior to the future time as a function of the stored pattern.

12. The method of claim 11, further comprising:
    opening the bank of the memory device according to the pattern of requests and the non-data commands.

13. The method of claim 12 further comprising:
    closing a disparate bank of the memory device based in part on the stored pattern.

14. The method of claim 12, wherein opening the bank further comprises scheduling a transmission of an activation request to the memory device.

15. The method of claim 14, wherein scheduling the transmission further comprises determining a time to schedule the transmission to decrease a power consumption characteristic.

16. The method of claim 11 further comprising:
    storing the pattern of requests and the non-data commands in the pattern library.

17. A system for data storage and retrieval comprising:
    means for storing a plurality of memory access patterns;
    means for receiving a plurality of memory read and write requests;
    means for recognizing a pattern among the plurality of memory read and write requests and associated non-data commands;
    means for determining a stored pattern, of the plurality of memory access patterns, that corresponds to the pattern;

means for determining, based on the stored pattern, a future bank activation command that is likely to be needed at a future time for opening a selected bank of memory in a memory device;
means for determining whether the selected bank of memory is currently open based on information in a stored table that identifies which of a plurality of banks are currently open; and
means for scheduling a bank activation command for opening the selected bank of memory in the memory device at a time prior to the future time in response to determining that the future bank activation command is likely to be needed and that the selected bank is not currently open.

18. The system of claim 17, further comprising:
means for scheduling memory read and write requests as a function of determining the future memory access request.

19. The system of claim 17, wherein the means for scheduling the bank activation command for altering the state of the bank of memory is further configured for opening the bank before the means for receiving the plurality of memory read and write requests receives a request associated with the bank.

20. The system of claim 17, wherein the means for determining the future bank activation command comprises means for predicting when a closed bank likely needs to be opened.

* * * * *